US011250583B2

(12) United States Patent
Suzuki et al.

(10) Patent No.: US 11,250,583 B2
(45) Date of Patent: Feb. 15, 2022

(54) STORAGE MEDIUM HAVING STORED LEARNING PROGRAM, LEARNING METHOD, AND LEARNING APPARATUS

(71) Applicant: FUJITSU LIMITED, Kawasaki (JP)

(72) Inventors: Kanata Suzuki, Kawasaki (JP); Yasuto Yokota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 16/662,734

(22) Filed: Oct. 24, 2019

(65) Prior Publication Data

US 2020/0151899 A1    May 14, 2020

(30) Foreign Application Priority Data

Nov. 12, 2018   (JP) .............................. JP2018-212572

(51) Int. Cl.
  *G06K 9/62*     (2006.01)
  *G06T 7/70*     (2017.01)
  *G06N 20/00*    (2019.01)
  *B25J 9/16*     (2006.01)

(52) U.S. Cl.
  CPC ............. *G06T 7/70* (2017.01); *B25J 9/163* (2013.01); *G06K 9/6262* (2013.01); *G06K 9/6267* (2013.01); *G06N 20/00* (2019.01); *G06K 2209/19* (2013.01); *G06T 2207/20081* (2013.01); *G06T 2207/30108* (2013.01)

(58) Field of Classification Search
  CPC ................................ G06T 7/70; G06K 9/6262
  See application file for complete search history.

(56) References Cited

U.S. PATENT DOCUMENTS

2010/0177198 A1\* 7/2010 Hayashi ............. H04N 5/23287
                                                      348/208.2

OTHER PUBLICATIONS

Yaskawa Electric Corporation, "Development of AI Picking Function Realizing Various Ways of Gripping of Target Objects by Robot", [Online], Nov. 21, 2017, Searched on Oct. 29, 2018. Internet <URL:https://www.yaskawa.co.jp/newsrelease/technology/35697> With Translation of the relevant part.
Wei Liu et al., "SSD: Single Shot MultiBox Detector", European Conference on Computer Vision (ECCV), Oct. 8-16, 2016, Searched on Oct. 29, 2018. Internet <URL:http://www.cs.unc.edu/~wliu/papers/ssd.pdf>.

\* cited by examiner

*Primary Examiner* — Tuan H Nguyen
(74) *Attorney, Agent, or Firm* — Fujitsu Patent Center

(57) ABSTRACT

A learning method is performed by a computers The method includes: receiving a first image that includes an object; generating a first rectangle in the first image, the first rectangle including therein a figure, that is set in advance to have a first inclination and that represents a gripping position of an object, and having a side parallel to a first direction; inputting the first image to a model, which outputs, from the input image, a rectangle parallel to the first direction and an inclination, to cause the model to output a second rectangle and a second inclination; and updating the model such that errors of the second rectangle and the second inclination with respect to the first rectangle and the first inclination respectively decrease.

12 Claims, 7 Drawing Sheets

STORAGE MEDIUM HAVING STORED LEARNING PROGRAM, LEARNING METHOD, AND LEARNING APPARATUS

CROSS-REFERENCE TO RELATED APPLICATION

This application is based upon and claims the benefit of priority of the prior Japanese Patent Application No. 2018-212572, filed on Nov. 12, 2018, the entire contents of which are incorporated herein by reference.

FIELD

The embodiment discussed herein is related to a non-transitory computer-readable storage medium having stored a learning program, a learning method, and a learning apparatus.

BACKGROUND

In the related art, there is known a technique for detecting, by image recognition, a gripping position at which a picking robot grips a part. For example, the Single Shot MultiBox Detector (SSD) is known as a method for detecting an object by image recognition.

The SSD uses a convolutional neural network as a model. The model of the SSD outputs, for each bounding box in an input image, a degree indicating how high the probability that the detection target exists. A bounding box is a rectangle (i.e., the coordinates of a rectangular border) that encloses a region in the input image.

The related art is described in Yaskawa Electric Corporation, "Development of AI Picking Function Realizing Various Ways of Gripping of Target Objects by Robot (Robotto ni yoru Taishoubutsu no Tayouna Tsukamikata wo Jitsugen-suru AI Pikkingu Kinou wo Kaihatsu)", [Online], [Retrieved on Oct. 29, 2018], Internet <URL: https://www.yaskawa.co.jp/newsrelease/technology/35697>.

The related art is also described in Wei Liu, Dragomir Anguelov, Dumitru Erhan, Christian Szegedy, Scott Reed, Cheng-Yang Fu, Alexander C. Berg, "SSD: Single Shot MultiBox Detector", [Online], [Retrieved on Oct. 29 2018], Internet <URL: http://www.cs.unc.edu/~wliu/papers/ssd.pdf>.

However, it is difficult to stably perform training of a model that detects a gripping position of an object with the techniques described above in some cases. Bounding boxes used in the SSD are different from one another in aspect ratio, size, position, and the like but are parallel to the vertical and horizontal directions of the image. In contrast, there are cases where objects to be gripped by a picking robot are placed in various orientations. Accordingly, the gripping positions are desirably uniquely identified including rotation angles in consideration of the orientations of the objects To address the issue described above, it is conceivable to prepare bounding boxes having different rotation angles in the SSD. In such a case, however, the calculation amount enormously increases as the number of bounding boxes increases. Therefore, this solution is not practical.

To address the issue described above, it is conceivable to include the rotation angle as one of items to be learned in the SSD. In this case, however, the rotation angle becomes discrete at the upper limit value and the lower limit value (for example, 0° and 180°) although the rotation angle is basically expressed by a continuous value. Therefore, training is not performed stably in some cases.

In one aspect, an object is to stably perform training of a model that detects a gripping position of an object.

SUMMARY

According to an aspect of the embodiments, a learning method is performed by a computer. The method includes: generating a first rectangle in a first image, the first rectangle including therein a figure, that is set in advance to have a first inclination and that represents a gripping position of an object, and having a side parallel to a first direction; inputting the first image to a model, which outputs, from an input image, a rectangle parallel to the first direction and an inclination, to cause the model to output a second rectangle and a second inclination; and updating the model such that errors of the second rectangle and the second inclination with respect to the first rectangle and the first inclination respectively decrease The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment of a learning program, a learning method, and a learning apparatus and a detection program, a detection method, and a detection apparatus using the same will be described in detail below with reference to the accompanying drawings. Note that this embodiment does not limit the present disclosure. The embodiment may be appropriately combined with another embodiment within a scope without contradiction.

Embodiment

Functional Configuration

Functional configurations of a learning apparatus and a detection apparatus will be described with reference to FIG.

Figure 1:
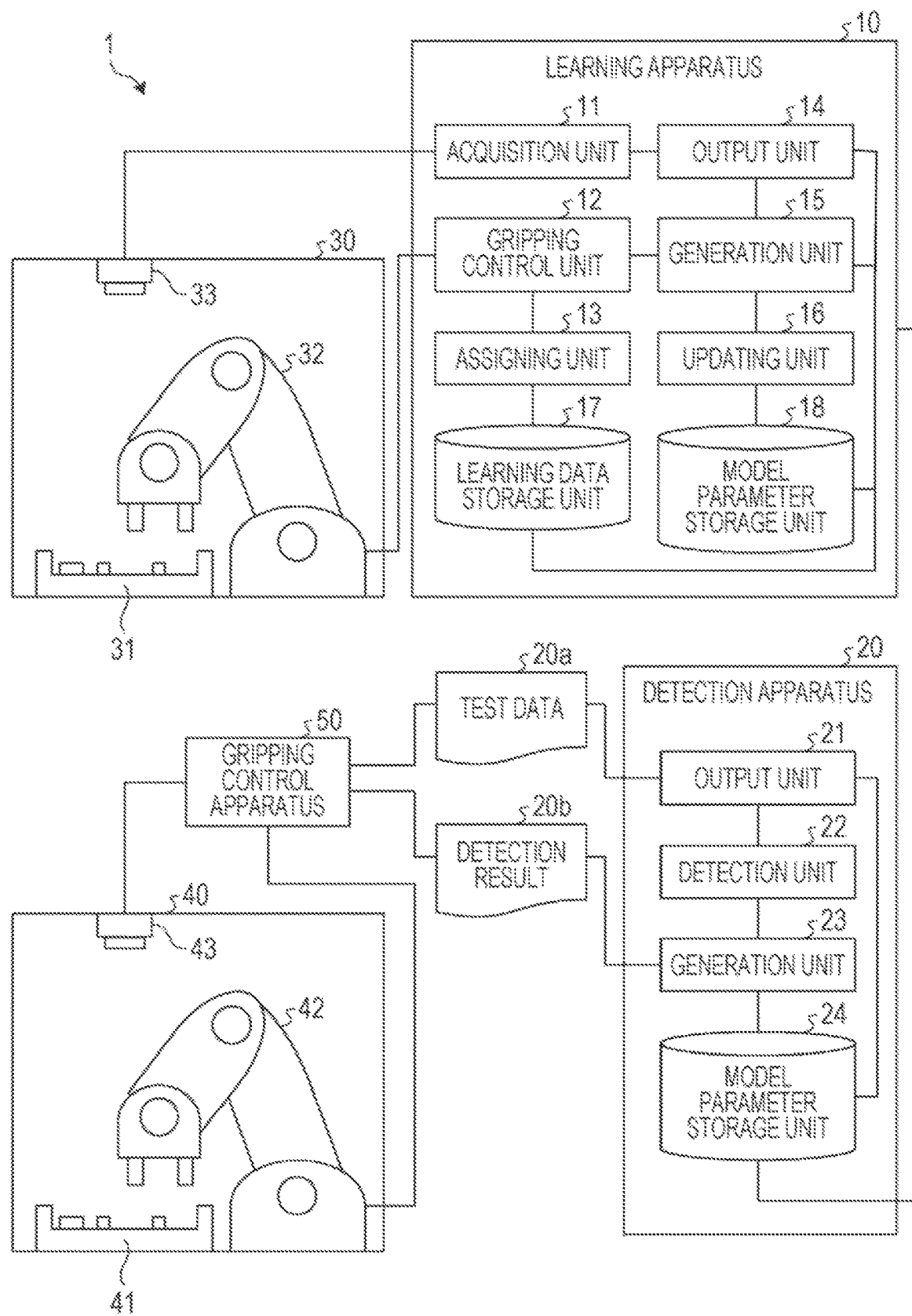
FIG. 1 is a functional block diagram illustrating a functional configuration of a system including a learning apparatus and a detection apparatus according to an embodiment.

1. FIG. 1 is a functional block diagram illustrating a functional configuration of a system including the learning apparatus and the detection apparatus according to an embodiment. A system 1 is a system for performing training of a model used in a picking robot, detection of a gripping position using the model, control of gripping actually performed by the picking robot, and so on. As illustrated in FIG. 1, the system 1 includes a learning apparatus 10, a detection apparatus 20, a gripping system 30, a gripping system 40, and a gripping control apparatus 50.

The learning apparatus 10 trains a model by using the gripping system 30. The detection apparatus 20 detects, by using the model trained by the learning apparatus 10, a gripping position based on test data 20a acquired from the gripping system 40, and outputs a result of the detection as a detection result 20b. The gripping control apparatus 50 controls the gripping system 40 based on the detection result 20b output from the detection apparatus 20.

For example, the gripping system 30 may be constructed in an environment for development and testing. The gripping system 40 may be actually operated in a factory or the like. The gripping systems 30 and 40 may be the same.

Configuration of Learning Apparatus

As illustrated in FIG. 1, the learning apparatus 10 is coupled to the gripping system 30. The gripping system 30 includes a tray 31, a robot 32, and a camera 33. Objects to be gripped are placed on the tray 31. The robot 32 is a picking robot having a two-finger hand. The robot 32 grips any of the objects placed on the tray 31. At that time, the robot 32 grips the object at a gripping position instructed by the learning apparatus 10. The camera 33 captures an image of the tray 31 from the above and transmits the captured image to the learning apparatus 10.

As illustrated in FIG. 1, the learning apparatus 10 includes an acquisition unit 11, a gripping control unit 12, an assigning unit 13, an output unit 14, a generation unit 15, an updating unit 16, a learning data storage unit 17, and a model parameter storage unit 18.

The acquisition unit 11 acquires an image of objects placed on the tray 31 from the camera 33. The gripping control unit 12 controls the robot 32 to grip an object in accordance with a gripping position input thereto. The assigning unit 13 assigns a label to the image acquired by the acquisition unit 11.

The label is information indicating a gripping position and whether gripping of an object is successful when the robot 32 tries to grip the object at the gripping position. Whether gripping is successful is determined by using the camera 33, another camera (not illustrated), a sensor, or the like. In the following description, it is assumed that learning data is constituted by a combination of an image and a label. For example, the assigning unit 13 assigns 1 as a confidence to a region for which gripping is successful. The assigning unit 13 assigns 0 as a confidence to the other regions.

The model according to the embodiment outputs, from an input image, a rectangle parallel to a first direction and an inclination. In the case where the image is a rectangle, the first direction is a direction parallel to any of the sides of the rectangle. The model further outputs, from the input image, a confidence for each class indicating the display content (namely, a type of the object) in the rectangle in the input image along with the rectangle and the inclination.

For example, there are two types of classes, which are a gripping position class and a background class. In the case where there are a plurality of types of objects, there are a plurality of classes of the gripping position. Thus, the classes may be set to be a gripping position class of a first type object, a gripping position class of a second type object, and a background class. The confidence may be a probability of a rectangle being in a certain class. For example, when the probability of a certain region being a gripping position is equal to 0.9, the confidence that the region is in the gripping position class is equal to 0.9.

It is assumed that the model according to the embodiment is implemented by causing a model of the SSD (of the conventional type) to further output an angle. The model of the SSD outputs, from an input image, any of bounding boxes that are rectangles set in advance and a confidence for each class. In this case, a bounding box is an example of a rectangle parallel to a first direction.

The output unit 14 inputs a first image to a model, which outputs from an input image a rectangle parallel to the first direction and an inclination, to cause the model to output a second rectangle, a second inclination, and a confidence for each class. In the embodiment, the output unit 14 inputs the first image to the model to cause the model to output a bounding box, an angle, and a confidence for each class. For example, the first image is an image acquired by the acquisition unit 11 from the camera 33.

The generation unit 15 generates a first rectangle in the first image. The first rectangle includes therein a figure that is set in advance to have a first inclination, based on hardware information of the picking robot, and that represents a gripping position of an object, and has a side parallel to the first direction.

The figure may be a rectangle inclined with respect to the image. In this case, the generation unit 15 generates, as the first rectangle, a rectangle having a minimum area and having a side parallel to the first direction among rectangles including therein all vertices of the figure that is a rectangle.

In the embodiment, the figure is a region that is assigned as a gripping position by the assigning unit 13. Therefore, the generation unit 15 generates the first rectangle based on the figure set, as the gripping position for the picking robot having the two-finger hand, for the object displayed in the first image.

The updating unit 16 updates the model such that errors of the second rectangle and the second inclination with respect to the first rectangle and the first inclination respectively decrease. The updating unit 16 updates the model such that an error between the confidence for a first class set in advance for the figure and the confidence for the second rectangle output by the model further decreases.

The updating unit 16 minimizes the errors in the rectangle and the confidence by using a technique similar to that of the conventional SSD. The error in the rectangle refers to an error between the bounding box output by the model and the first rectangle. The error in the confidence refers to an error between the confidence for the first class output by the model and the confidence for the first class set in advance for the figure.

The confidence for the first class set in advance for the figure may be the confidence included in the label assigned by the assigning unit 13. For example, suppose that in the case where the first class is the gripping position class, gripping is successful in a certain region and the confidence for the certain region output by the model is equal to 0.9. In this case, the error in the confidence for the certain region is equal to 0.1. It is assumed that 1 is assigned to a certain region as the confidence by the assigning unit 13 when gripping is successful in the certain region.

The updating unit 16 updates the model such that an error between the angle output by the model and the angle representing the first inclination decreases. In the SSD, a rectangle parallel to an image is regarded as a bounding box to be recognized. However, the gripping posture of the picking robot is not necessarily parallel to the image. Therefore, in the embodiment, the gripping position is expressed by using a bounding box and an angle. Conversion between a combination of a bounding box and an angle and an inclined rectangle is performed by the generation unit 15.

The learning data storage unit 17 stores the learning data. As described before, the learning data is constituted by a combination of an image and a label. For example, the learning data is constituted by a combination of an image and a region to which 1 is assigned as the confidence by the assigning unit 13 within the image.

Figure 2:
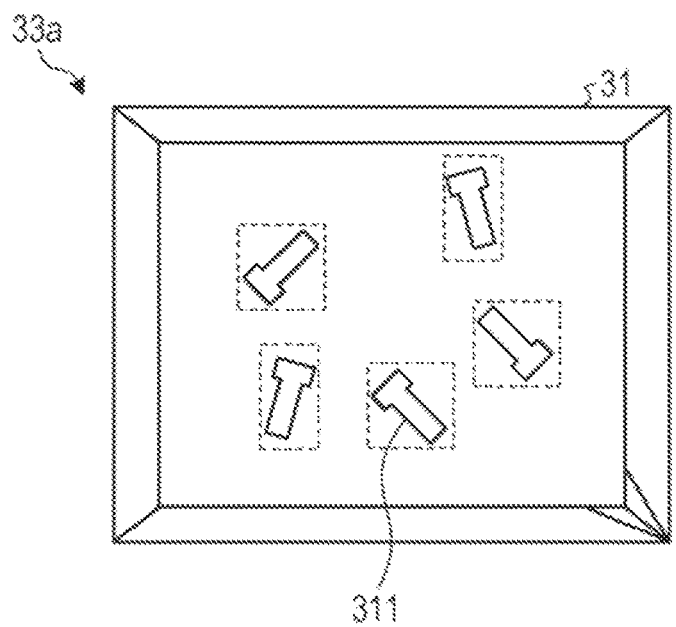
FIG. 2 is a diagram for describing object ranges.

The model parameter storage unit 18 stores parameters of the model. For example, the model parameter storage unit 18 stores parameters such as weights and bias used in a neural network. It is assumed that, by using the parameters stored in the model parameter storage unit 18, a trained model that has been trained by the learning apparatus 10 may be reproduced. The updating unit 16 is capable of updating the model by updating the parameters stored in the model parameter storage unit 18, Process by Learning Apparatus A process performed by the learning apparatus 10 will be described in detail. As illustrated in FIG. 2, image recognition performed in the related art such as the SSD is intended to detect a rectangular object range parallel to an image. FIG. 2 is a diagram for describing object ranges. An image 33a is an image of objects 311 placed on the tray 31 acquired by the acquisition unit 11 from the camera 33.

Figure 3:
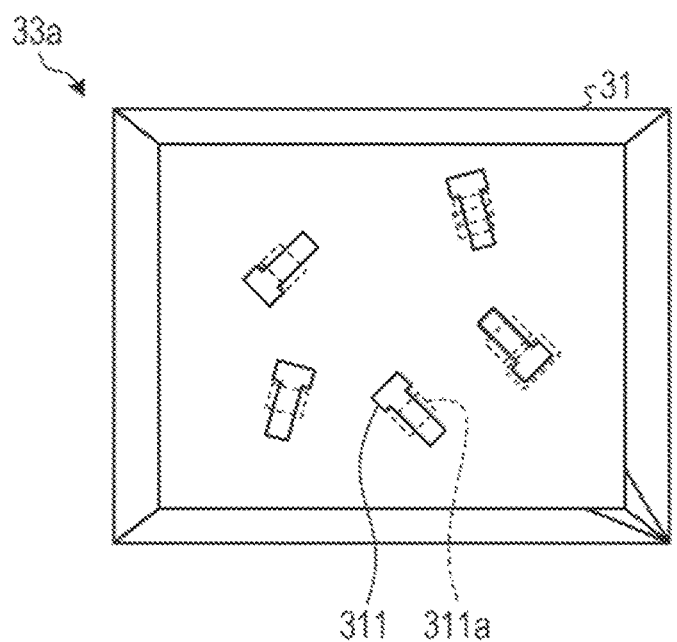
FIG. 3 is a diagram for describing candidates for a gripping position.

However, for example, in the case where a shape of an object 311 to be gripped is asymmetry and the object 311 is placed asymmetrically in the horizontal and vertical directions as illustrated in FIG. 3, gripping becomes easier if the figure representing the gripping position is an inclined rectangle. As illustrated in FIG. 3, when the gripping position of an object 311 is represented as an inclined rectangle 311a, the robot 32 is able to grip the object 311 by superposing the two fingers on the respective shorter sides of the rectangle 311a. The object 311 is, for example, a hexagon-headed bolt.

Figure 4:
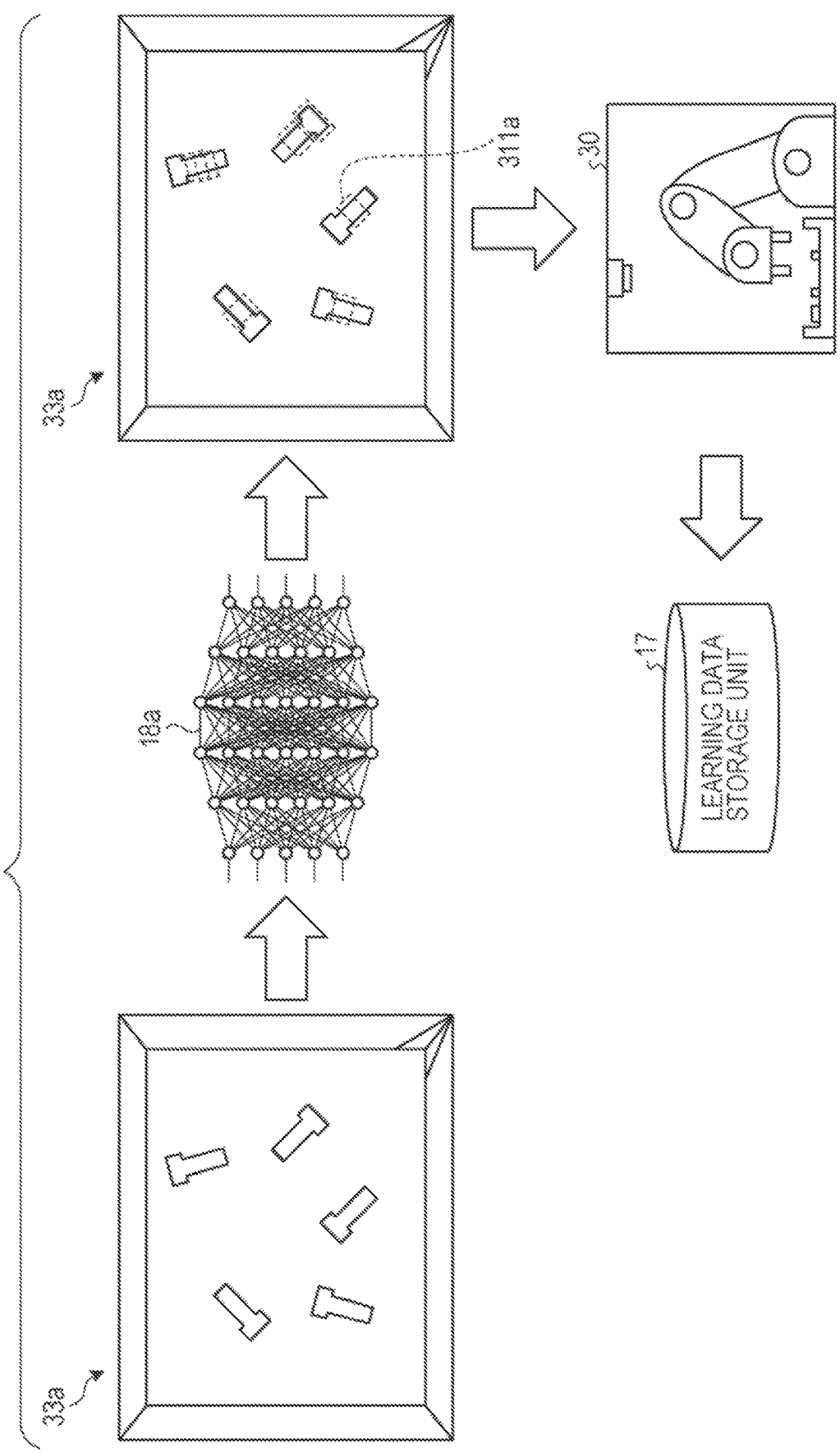
FIG. 4 is a diagram for describing a flow of a generation process.

The learning apparatus 10 generates the learning data by performing gripping trials. FIG. 4 is a diagram for describing a flow of a generation process. As illustrated in FIG. 4, the output unit 14 first inputs the image 33a acquired by the acquisition unit 11 to a model 18a. The model 18a is a model that is created based on the parameters stored in the model parameter storage unit 18. Based on the image 33a input thereto, the model 18a outputs, in addition to a rectangle parallel to the image 33a similarly in the conventional SSD, an angle representing an inclination of the rectangle 311a with respect to the image 33a, to represent a rectangle 311a as illustrated in FIGS. 4. More details are explained in FIG. 6. If there are a plurality of objects 311 as illustrated in FIG. 4, the model 18a may output a plurality of rectangles and a plurality of angles.

The generation unit 15 generates the inclined rectangle 311a from the rectangle and the angle being output from the model 18a. The gripping control unit 12 causes the robot 32 to try to grip the object at the gripping position represented by the inclined rectangle 311a. The assigning unit 13 then stores the image 33a, the rectangle and the angle output by the model 18a, and a label indicating whether gripping is successful in the learning data storage unit 17 in combination with one another for each of the objects 311 in the image 33a.

The learning apparatus 10 then performs a learning process by using the learning data generated through gripping trials. The learning data does not have to be generated through gripping trials and may be data having a predetermined format, For example, the learning data may be virtually generated by using computer graphics (CG) or image recognition technology without actually performing gripping trials.

Figure 5:
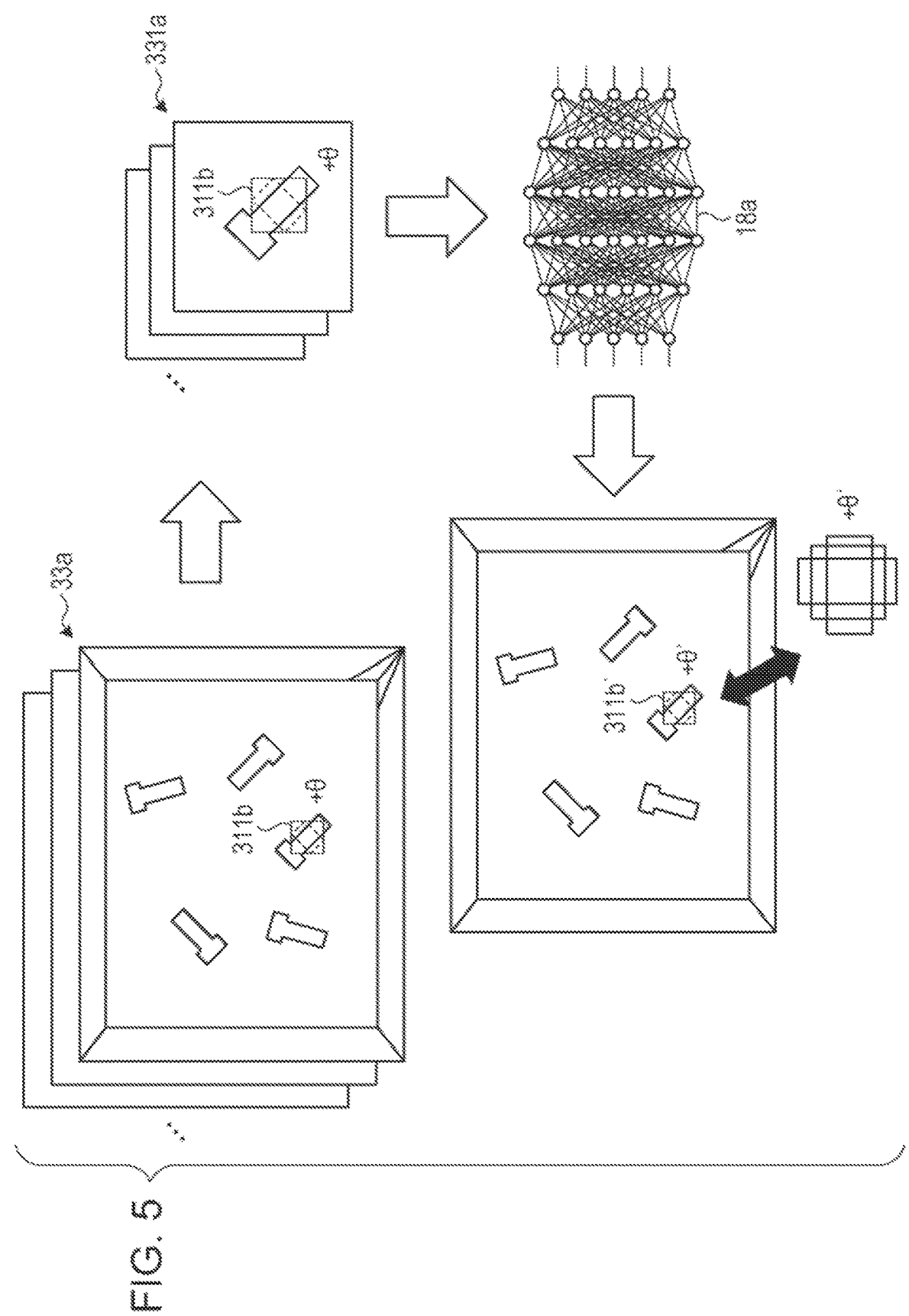
FIG. 5 is a diagram for describing a flow of a learning process.

FIG. 5 is a diagram for describing a flow of a learning process. As illustrated in FIG. 5, the output unit 14 expands a plurality of pieces of learning data and inputs the expanded pieces of learning data to the model 18a. For example, one piece of learning data includes the image 33a, a rectangle 311b parallel to the image 33a, and an angle θ as referenced in FIG. 6.

The output unit 14 expands the learning data by clipping the image 33a at random positions to generate a plurality of smaller images 331a, each has a certain size and includes one or more of the rectangle 311b, as illustrated in FIG. 4. For example, the output unit 14 expands the piece of learning data including the image 33a to pieces of learning data corresponding to a plurality of clipped images 331a.

The updating unit 16 updates the parameters stored in the model parameter storage unit 18 based on the output of the model 18a to which the learning data has been input. For example, the updating unit 16 may update the parameters by using a technique such as backpropagation of a neural network.

The updating unit 16 may use an error of the rectangle 311b as an error from a default bounding box similarly to the SSD of the related art. An angle θ' output by the model 18a may represent two types of inclinations. In such a case, the updating unit 16 may optimize an error between the angle θ' output by the model 18a and the inputted angle θ as a problem of regression and classification.

Figure 6:
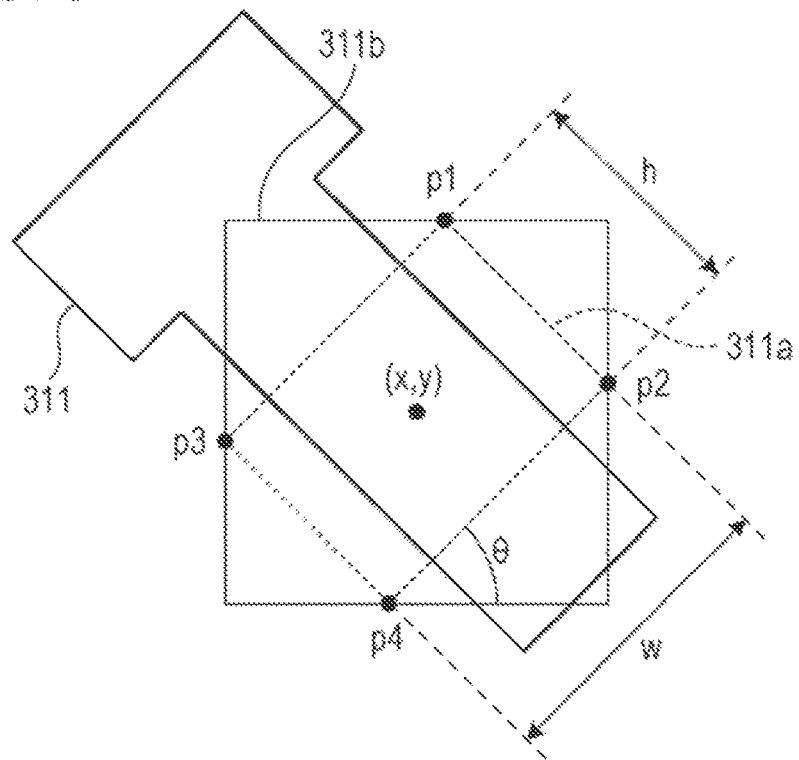
FIG. 6 is a diagram for describing a rectangle representing the gripping position.

A method for generating a rectangle parallel to an image performed by the generation unit 15 will be described. FIG. 6 is a diagram for describing a rectangle representing the gripping position. The rectangle 311a is a figure representing the gripping position, Coordinates (x, y) are coordinates of the center of the rectangle 311a. In addition, w and h respectively denote a width and a height of the rectangle 31.1a Further, θ denotes an angle representing the inclination of the rectangle 311a.

The generation unit 15 first calculates a group of points p1, p2, p3, and p4 representing the respective vertices of the rectangle 311a, The generation unit 15 then generates a rectangle 311b having the smallest area among rectangles that include therein the group of points p1, p2, p3 and p4 and are parallel to the sides of the image 33a. For example, the generation unit 15 generates the rectangle 311b in which the group of points p1, p2, p3 and p4 are present on different sides as illustrated in FIG. 6.

Conversely, the generation unit 15 may generate the rectangle 311a representing the gripping position from the rectangle 311b and the angle θ. At that time, at least one of the width w and the height h may be set as a fixed value so that the rectangle 311a is uniquely determined.

Configuration of Detection Apparatus

As illustrated in FIG. 1, the detection apparatus 20 is coupled to the gripping system 40. The gripping system 40 includes a tray 41, a robot 42, and a camera 43. Objects to be gripped are placed on the tray 41. The robot 42 is a picking robot having a two-finger hand. The robot 42 grips any of the objects placed on the tray 41. At that time, the robot 42 grips the object at a gripping position instructed by the gripping control apparatus 50. The camera 43 captures an image of the tray 41 from the above and transmits the captured image to the gripping control apparatus 50.

The gripping control apparatus 50 has substantially the same functions as the acquisition unit 11 and the gripping control unit 12 of the learning apparatus 10. For example, the gripping control apparatus 50 acquires an image of the objects placed on the tray 41 from the camera 43. The gripping control apparatus 50 transmits the acquired image to the detection apparatus 20 as the test data 20a. The gripping control apparatus 50 controls the robot 42 in accordance with the gripping position input thereto as the detection result 20b to cause the robot 42 to grip the object.

As illustrated in FIG. 1, the detection apparatus 20 includes an output unit 21, a detection unit 22, a generation unit 23, and a model parameter storage unit 24. The model parameter storage unit 24 stores the same parameters as those stored in the model parameter storage unit 18 of the learning apparatus 10.

The output unit 21 has substantially the same functions as the output unit 14 of the learning apparatus 10. For example, the output unit 21 inputs the image of the test data 20a to a model to cause the model to output bounding boxes, angles, and confidences for respective classes. The detection unit 22 detects a combination with the highest confidence from among the combinations of the bounding box and the angle output by the model. The image of the test data 20a is an example of a second image. The bounding box and the angle which the output unit 21 causes the model to output are examples of a third rectangle and a third inclination.

The generation unit 23 has substantially the same functions as the generation unit 15 of the learning apparatus 10. For example, the generation unit 23 generates an inclined rectangle representing the gripping position from a bounding box and an angle that are detected by the detection unit 22. The gripping position generated by the generation unit 23 is transmitted to the gripping control apparatus 50 as the detection result 20b.

Flows of Processes

Figure 7:
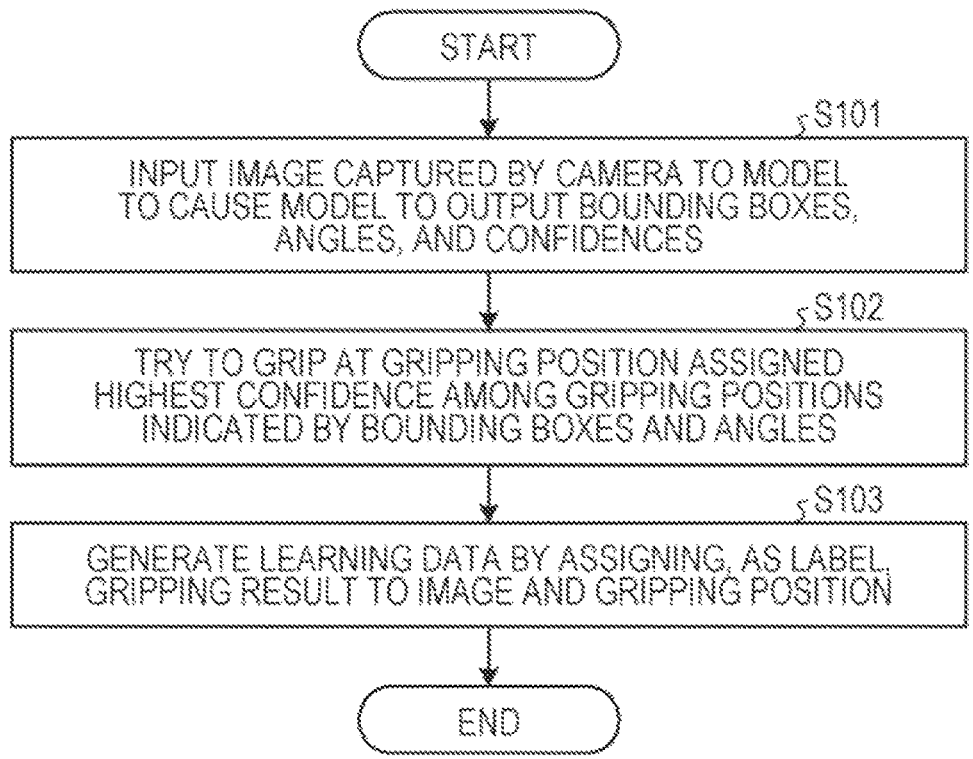
FIG. 7 is a flowchart illustrating the flow of the generation proses.
Figure 8:
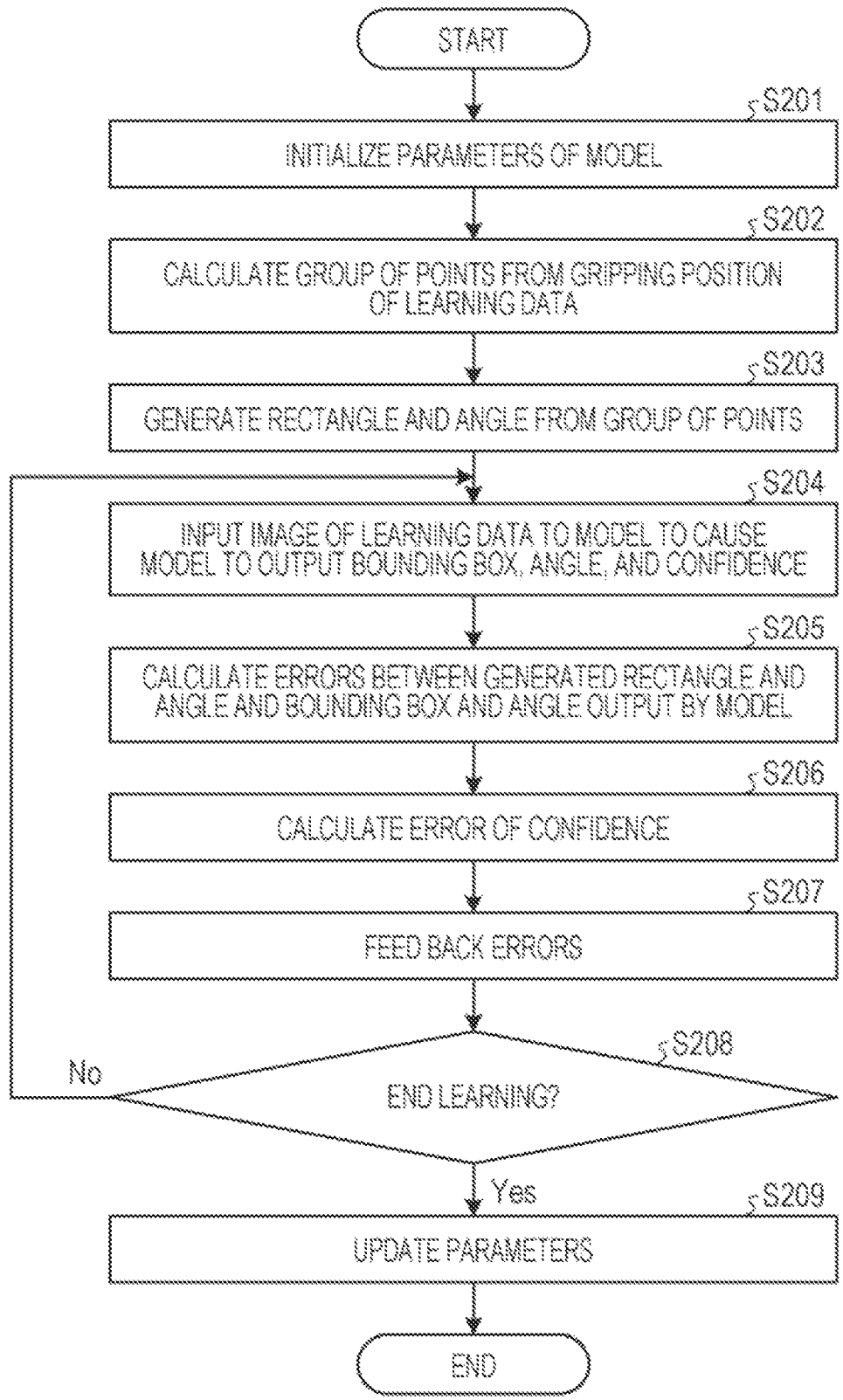
FIG. 8 is a flowchart illustrating the flow of the learning process.
Figure 9:
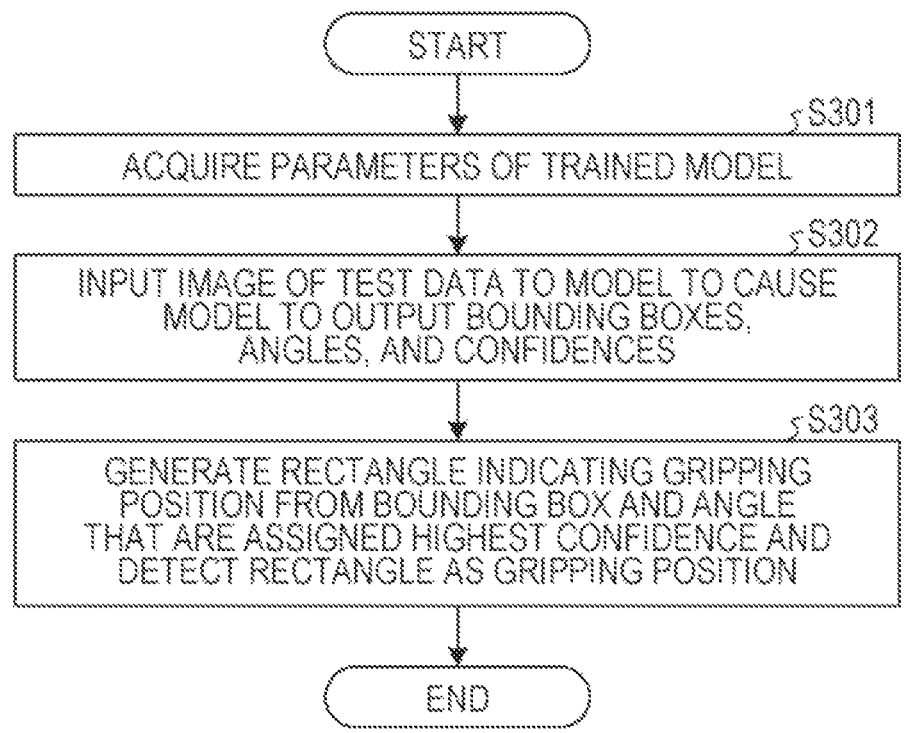
FIG. 9 is a flowchart illustrating a flow of a detection process.

Flows of processes according to the embodiment will be described with reference to flowcharts of FIGS. 7, 8, and 9. FIG. 7 is a flowchart illustrating a flow of the generation process. FIG. 8 is a flowchart illustrating a flow of the learning process. FIG. 9 is a flowchart illustrating a flow of the detection process.

The learning data generation process will be described with reference to the flowchart of FIG. 7, As illustrated in FIG. 7, the learning apparatus 10 first inputs an image captured by the camera 33 to the model to cause the model to output bounding boxes, angles, and confidences (step S101).

The learning apparatus 10 then performs a gripping trial for a gripping position with the highest confidence among the gripping positions represented by the bounding boxes and the angles (step S102). The learning apparatus 10 then generates learning data in which a result of the gripping trial is assigned as a label to the image and the gripping position, and stores the learning data in the learning data storage unit 17 (step S103).

The flow of the learning process will be described with reference to the flowchart of FIG. 8. As illustrated in FIG. 8, the learning apparatus 10 first initializes parameters of the model that are stored in the model parameter storage unit 18 (step S201). The learning apparatus 10 then calculates the group of points (p1 to p4) from the gripping position of the learning data (step S202). The learning apparatus 10 then generates the rectangle 311b and the angle θ from the group of points (step S203).

The learning apparatus 10 inputs the image of the learning data to the model to cause the model to output a bounding box, an angle, and a confidence (step S204). The learning apparatus 10 calculates errors between the generated rectangle and angle and the bounding box and angle output by the model (step S205). The learning apparatus 10 further calculates an error in the confidence (step S206).

The learning apparatus 10 feeds the calculated errors back to the model (step S207). At that time, for example, the learning apparatus 10 holds, as temporary data, the parameters of the model that have been updated based on feedback of the errors. The learning apparatus 10 then determines whether learning has been finished based on whether a certain condition is satisfied (step S208). For example, the certain condition may be that learning data yet to be input no longer exists, learning has been performed a predetermined number of times, amounts by which the parameters are updated have converged, or the like.

If the learning apparatus 10 determines that learning has been finished (Yes in step S208), the learning apparatus 10 updates the parameters in the model parameter storage unit 18 (step S209). The process then ends. At that time, the learning apparatus 10 may update the parameters by overwriting the model parameter storage unit 18 with the temporary data held therein.

If the learning apparatus 10 determines that learning has not been finished (No in step S208), the process returns to step S204, in which the learning apparatus 10 repeats the processing. At that time, the learning apparatus 10 may perform the following processing after the temporary data held therein is reflected in the model.

The flow of the detection process will be described with reference to the flowchart of FIG. 9. As illustrated in FIG. 9, the detection apparatus 20 acquires the parameters of the trained model from the learning apparatus 10, and stores the parameters in the model parameter storage unit 24 (step S301). The detection apparatus 20 may share the model parameter storage unit 18 with the learning apparatus 10. In such a case, step S301 is omitted.

The detection apparatus 20 inputs the image of the test data 20a to the model to cause the model to output bounding boxes, angles, and confidences (step S302). The detection apparatus 20 generates a rectangle representing the gripping position from a bounding box and an angle that are associated with the highest confidence and detects the generated rectangle as the gripping position (step S303).

At that time, the detection apparatus 20 performs processing opposite to steps S202 and S203 in FIG. 8. For example, the detection apparatus 20 generates a group of points representing the gripping position from the bounding box that is a rectangle and the angle.

Advantages

As described above, the learning apparatus 10 generates a first rectangle in a first image. The first rectangle includes therein a figure that is set in advance to have a first inclination and that represents a gripping position of an object, and has a side parallel to a first direction. The learning apparatus 10 inputs the first image to a model, which outputs from an input image a rectangle parallel to the first direction and an inclination, to cause the model to output a second rectangle and a second inclination. The learning apparatus 10 updates the model such that errors of the second rectangle and the second inclination with respect to the first rectangle and the first inclination respectively decrease. In this manner, the learning apparatus 10 may represent the gripping position as a rectangle and treat the angle as a continuous value. Therefore, the embodiment may enable training of the model that detects the gripping position of an object to be performed stably.

The learning apparatus 10 generates, as the first rectangle, a rectangle having a minimum area and a side parallel to the first direction among rectangles including therein all vertices of the figure that is a rectangle. Consequently, the learning apparatus 10 may calculate the gripping position from a rectangle parallel to an image.

The model further outputs a confidence for each class indicating display content (type of object) in the rectangle in the input image, along with the rectangle and the inclination. The learning apparatus 10 inputs the first image to the model to cause the model to output a confidence for each class along with the second rectangle and the second inclination, The learning apparatus 10 updates the model such that an error between a confidence for the first class set in advance for the figure and the confidence for the second rectangle output by the model further decreases. In this v ay, the learning apparatus 10 may update the model by using a method similar to that of image recognition of the related art. Therefore, the learning process performed by the learning apparatus 10 may be easily implemented based on the technique of the related art.

The model of the SSD outputs any of bounding boxes that are rectangles set in advance and a confidence for each class from an input image. The model is equivalent to the model of the SSD that is further caused to output an angle. The learning apparatus 10 inputs the first image to the model to cause the model to output a bounding box, an angle, and a confidence for each class. The learning apparatus 10 updates the model such that an error between the bounding box output by the model and the first rectangle and an error between the angle output by the model and the angle representing the first inclination decrease. The learning apparatus 10 updates the model such that an error between the confidence for the first class output by the model and the confidence for the first class set in advance for the figure decreases. In this way, the learning apparatus 10 may update the model by using a method similar to that of the SSD. Therefore, the learning process performed by the learning apparatus 10 may be easily implemented based on the technique of the related art.

The detection apparatus 20 inputs a second image to the model updated by the learning apparatus 10 to cause the model to output a third rectangle and a third inclination. The detection apparatus 20 detects a gripping position of an object from the third rectangle and the third inclination. Consequently, the detection apparatus 20 may stably detect the gripping position.

The detection apparatus 20 outputs the detected gripping position to the gripping control apparatus 50 that controls the robot 42 that grips an object. Consequently, the detection apparatus 20 may cause the gripping control apparatus 50 and the robot 42 to stably grip the object In the embodiment above, the description has been given on the assumption that the model outputs a rectangle parallel to an image and an angle. However, the model may output at least one of a width and a height of an inclined rectangle representing a gripping position. In such a case, the learning apparatus 10 acquires learning data including the width and the height of the gripping position, and performs learning so as to minimize the errors of the width and the height.

System

The processing procedures, the control procedures, the specific names, and the information including the various kinds of data and parameters cited in the specification and drawings described above may be changed in a given manner unless otherwise specified. The specific examples, distributions, numerical values, and so on described in the embodiment are merely examples and may be changed in a given manner.

The constituents of each of the apparatuses illustrated in the drawings are functionally conceptual and do not necessarily have to be physically configured as illustrated. For example, the specific configuration regarding the dispersion and integration of the apparatuses is not limited to the illustrated one. For example, all or some of the apparatuses may be configured to be distributed or integrated functionally or physically in given units depending on various loads, usage conditions, and so on. All or given some of processing functions performed by the apparatuses may be implemented by a central processing unit (CPU) and a program to be analyzed and executed by the CPU, or may be implemented as hardware by wired logic.

Hardware

Figure 10:
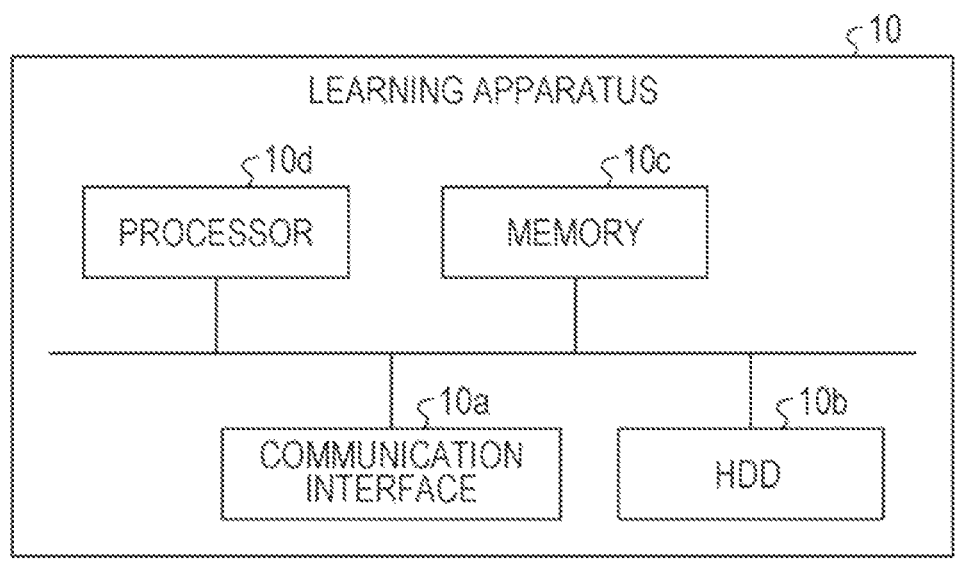
FIG. 10 is a diagram for describing an example of a hardware configuration.

FIG. 10 is a diagram for describing an example of a hardware configuration. As illustrated in FIG. 10, the learning apparatus 10 includes a communication interface 10a, a hard disk drive (HDD) 10b, a memory 10c, and a processor 10d. The communication interface 10a, the HDD 10b, the memory 10c, and the processor 10d illustrated in FIG. 10 are coupled to each other by a bus or the like. The detection apparatus 20 also has substantially the same hardware configuration as the learning apparatus 10. The detection apparatus 20 is also implemented by substantially the same hardware configuration as the learning apparatus 10.

The communication interface 10a is a network interface card or the like and performs communication with other servers. The HDD 10b stores a program and databases (DB) for causing the functional units illustrated in FIG. 1 to operate The processor 10d is a hardware circuit that reads, from the HDD 10b or the like, a program for causing the substantially the same processes as those of the processing units illustrated in FIG. 1 to be performed and loads the program to the memory 10c to run a process of performing the functions described with reference to FIG. 1 and so on. For example, this process performs functions that are substantially the same as those of each of the processing units included in the learning apparatus 10. For example, the processor 10d reads a program having substantially the same functions as the acquisition unit 11, the gripping control unit 12, the assigning unit 13, the output unit 14, the generation unit 15, and the updating unit 16 from the HDD 10b or the like. The processor 10d then executes a process for performing substantially the same processing as the acquisition unit 11, the gripping control unit 12, the assigning unit 13, the output unit 14, the generation unit 15, the updating unit 16, and so on.

As described above, the learning apparatus 10 operates as an information processing apparatus that performs a learning method as a result of reading and executing the program. The learning apparatus 10 may implement functions that are substantially the same as those of the embodiment described above as a result of reading the program from a storage medium with a medium reading apparatus and executing the read program. The program described in other embodiments is not limited to a program that is executed by the learning apparatus 10. For example, the present disclosure may also be applied to cases where another computer or a server executes the program and where another computer and a server execute the program in cooperation with each other.

The program may be distributed via a network such as the Internet. The program may be recorded on a computer-readable storage medium such as a hard disk, a flexible disk (FD), a compact disc read-only memory (CD-ROM), a magneto-optical disk (MO), or a digital versatile disc (DVD) and may be executed after being read from the storage medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a learning program for causing a computer to execute a process, the process comprising:
    receiving a first image that includes an object;
    generating a first rectangle in the first image, the first rectangle including therein a figure, that is set in advance to have a first inclination and that represents a gripping position of the object, and having a side parallel to a first direction;
    inputting the first image to a model, which outputs, from an input image, a rectangle parallel to the first direction and an inclination, to cause the model to output a second rectangle and a second inclination; and
    updating the model such that errors of the second rectangle and the second inclination with respect to the first rectangle and the first inclination respectively decrease.

2. The non-transitory computer-readable storage medium according to claim 1, wherein
    in the generating, a rectangle having a minimum area and a side parallel to the first direction is selected as the first rectangle among rectangles each including therein all vertices of the figure that is a rectangle.

3. The non-transitory computer-readable storage medium according to claim 1, the process further comprising:
    inputting a second image to the model that has been updated in the updating, to cause the model to output a third rectangle and a third inclination; and
    detecting a gripping position of an object from the third rectangle and the third inclination.

4. The non-transitory computer-readable storage medium according to claim 3, the process further comprising:
    outputting the gripping position detected in the detecting to a gripping control apparatus that controls a robot for gripping an object.

5. The non-transitory computer-readable storage medium according to claim 1, wherein the model further outputs, from the input image, a confidence for each class indicating display content in the rectangle in the input image, along with the rectangle and the inclination,
    in the inputting, the first image is input to the model to cause the model to output a confidence for each class along with the second rectangle and the second inclination, and
    in the updating, the model is updated such that an error between a confidence for a first class set in advance for the figure and the confidence for the second rectangle output by the model further decreases.

6. The non-transitory computer-readable storage medium according to claim 5, wherein
    the model is a model obtained by causing a model of Single Shot MultiBox Detector (SSD) to further output an angle, the model of SSD being configured to output, from an input image, any of bounding boxes that are rectangles set in advance and a confidence for each class,
    in the inputting, the first image is input to the model to cause the model to output a bounding box as the second rectangle, an angle as the second angle, and a confidence for each class, and
    in the updating, the model is updated such that an error between the bounding box output by the model and the first rectangle, an error between the angle output by the model and the first angle, and an error between the confidence for the first class output by the model and a confidence for the first class set in advance for the figure decrease.

7. A learning method performed by a computer, the method comprising:
    receiving a first image that includes an object;
    generating a first rectangle in the first image, the first rectangle including therein a figure, that is set in advance to have a first inclination and that represents a gripping position of the object, and having a side parallel to a first direction;
    inputting the first image to a model, which outputs, from an input image, a rectangle parallel to the first direction and an inclination, to cause the model to output a second rectangle and a second inclination; and
    updating the model such that errors of the second rectangle and the second inclination with respect to the first rectangle and the first inclination respectively decrease.

8. The learning method according to claim 7, the method further comprising:
    inputting a second image to the model that has been updated in the updating, to cause the model to output a third rectangle and a third inclination; and
    detecting a gripping position of an object from the third rectangle and the third inclination.

9. The learning method according to claim 8, the method further comprising:
    outputting the gripping position detected in the detecting to a gripping control apparatus that controls a robot for gripping an object.

10. A learning apparatus comprising:
    a memory, and
    a processor coupled to the memory and configured to:
    receive a first image that includes an object;
    generate a first rectangle in the first image, the first rectangle including therein a figure, that is set in advance to have a first inclination and that represents a gripping position of the object, and having a side parallel to a first direction;

input the first image to a model, which outputs, from an input image, a rectangle parallel to the first direction and an inclination, to cause the model to output a second rectangle and a second inclination; and update the model such that errors of the second rectangle and the second inclination with respect to the first rectangle and the first inclination respectively decrease.

11. The learning apparatus according to claim 10, the processor is further configured to:

input a second image to the model that has been updated in the update, to cause the model to output a third rectangle and a third inclination; and detect a gripping position of an object from the third rectangle and the third inclination.

12. The learning apparatus according to claim 11, the processor is further configured to:

output the gripping position detected in the detecting to a gripping control apparatus that controls a robot for gripping an object.

\* \* \* \* \*